US006516153B2

(12) United States Patent
Honda et al.

(10) Patent No.: US 6,516,153 B2
(45) Date of Patent: Feb. 4, 2003

(54) CAPACITOR CHARGING APPARATUS AND ELECTRONIC FLASH AND APPARATUS CONTAINING SAME

(75) Inventors: Yoshiaki Honda, Kanagawa (JP); Yukio Odaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/987,535

(22) Filed: Nov. 15, 2001

(65) Prior Publication Data

US 2002/0057909 A1 May 16, 2002

(30) Foreign Application Priority Data

Nov. 15, 2000 (JP) ....................................... 2000-347361
Nov. 15, 2000 (JP) ....................................... 2000-347362

(51) Int. Cl.[7] ................................................ G03B 15/05

(52) U.S. Cl. ................... 396/206; 396/277; 315/241 P; 320/166

(58) Field of Search ................................. 396/205, 206, 396/277, 279, 301–303; 315/241 P, 241 R; 320/166

(56) References Cited

U.S. PATENT DOCUMENTS 3,810,212 A * 5/1974 Biber ......................... 396/206
4,272,806 A * 6/1981 Metzger ................. 315/241 P
5,365,305 A * 11/1994 Seki et al. .............. 396/301 X
RE36,239 E * 6/1999 Kobayashi et al. ......... 396/206
6,064,176 A * 5/2000 Odaka .................... 396/206 X
6,289,180 B1 * 9/2001 Jeng ........................... 396/206

* cited by examiner

*Primary Examiner*—W. B. Perkey
(74) *Attorney, Agent, or Firm*—Fitzpatrick, Cella, Harper & Scinto

(57) ABSTRACT

A capacitor charging apparatus includes a DC/DC converter for stepping up the voltage of a battery and charging the capacitor; a detection circuit that determines whether a primary current of the DC/DC converter reaches a predetermined limit current; a control circuit that controls the DC/DC converter according to a detection signal received from the detection circuit; and a battery-information detection circuit that detects battery information of the battery. The control circuit performs a predetermined calculation using the battery information received from the battery-information detection circuit to determine the predetermined limit current and to vary the primary current of the DC/DC converter so as to control the DC/DC converter each time the capacitor is charged by the DC/DC converter.

12 Claims, 14 Drawing Sheets

A, A' : CURRENTS FLOWING THROUGH PRIMARY WINDING OF OSCILLATING TRANSFORMER

B, B' : GATE POTENTIALS OF OSCILLATING FET

C, C' : OUTPUT VOLTAGES OF COMPARATOR

CAPACITOR CHARGING APPARATUS AND ELECTRONIC FLASH AND APPARATUS CONTAINING SAME

BACKGROUND OF THE INVENTION

1. Field of the Invention

The present invention relates to capacitor charging apparatuses, electronic flash (stroboscope) apparatuses, and cameras having an internal electronic flash (stroboscope) apparatus.

2. Description of the Related Art

Forward-type converters mainly have been used for booster circuits in conventional electronic flashlight (stroboscope) apparatuses. Forward-type booster circuits are simple in circuit structure and are affected little by variations of oscillating transformers. Therefore, they have been widely used.

As cameras have been made more compact, low-capacity batteries mainly have been used. In contrast, high guide numbers are required, which means a large amount of flash light is required. Therefore, flyback-type converters, which are more efficient than forward-type converters, has been started. In general flyback-type converters (hereinafter just called flyback converters), oscillation is controlled such that the primary current of an oscillating transformer is detected and the primary current of the oscillating transformer is interrupted at a predetermined current (hereinafter called Ip). When a main capacitor is charged by a flyback converter, efficient charging is achieved by a low current. Low-current charging, however, requires a long charging time, generates a release time lag at time of photograph capture, and therefore, fails to provide a good chance of timely pressing the shutter release. To avoid such a case, and in addition, to reduce the charging time, a relatively high current flow needs to be generated.

Since the amount of current flow differs between a case when a new battery is used and a case when a partially-used battery is used, when the limit current of the primary current (hereinafter called a primary limit current) of the converter is set to Ip1 with a new battery as shown in FIG. 9, it takes a long time to reach Ip1 with a partially-used battery and the amount of current indicated by hatching between t1 and t2 is wasted. In FIG. 9, L1 indicates the primary current obtained with a new battery, and L2 indicates the primary current obtained with a partially consumed battery.

When the primary limit current is set to Ip2 with a partially used battery, Ip2 cannot be a large value and a long charging time is required.

In a circuit in which the limit current Ip is detected at a constant current irrespective of the state of a battery, if the battery is consumed, the efficiency of the flyback converter is reduced, and finally, the battery current cannot be controlled.

This point will be described below by referring to FIG. 15. As a battery is consumed, the output voltage of the battery is reduced and the internal resistance of the battery increases. As shown in a waveform "b" or a waveform "c" in FIG. 15, the primary current of the oscillating transformer has a drooped waveform (approaching horizontal asymptote). This is because the equivalent circuit of the flyback converter is formed of a series circuit of a power supply having the voltage of the battery, the internal resistor of the battery, a loop resistor, and an inductor. A current I flowing through the circuit is expressed by the following equation.

$$I=\{E/(Rbat+R)\}*[1-exp\{-(Rbat+R)*t/L\})]$$

where, E indicates the voltage of the battery, Rbat indicates the internal resistance of the battery, R indicates the loop resistance, and L indicates the inductance of the primary winding of the oscillating transformer.

As the battery is consumed, the primary current of the oscillating transformer becomes a drooped waveform as shown by the waveform "b" in FIG. 15. A hatched portion in FIG. 15 is almost a loss and efficiency decreases. As the battery is further consumed, the primary current of the oscillating transformer continues to flow (because it does not reach the limit current Ip), and a charging operation is not performed, as shown by the waveform "c" in FIG. 15.

To solve this problem, a method can be considered in which the limit current Ip is appropriately controlled according to the state of the battery. In this case, however, it is necessary to change a threshold voltage of the converter, which controls the limit current Ip. Therefore, a D/A converter is required in a control circuit, and thereby the circuit structure of a camera becomes complicated.

SUMMARY OF THE INVENTION

The present invention has been made in consideration of the foregoing conditions. Accordingly, it is an object of the present invention to provide a capacitor charging apparatus which has a simple circuit structure and efficiently charges a capacitor irrespective of the state of a partially consumed battery.

Another object of the present invention is to provide an electronic flash (stroboscope) apparatus which has a simple circuit structure and efficiently charges a capacitor irrespective of the state of a partially consumed battery.

In one aspect, an object of the present invention is achieved by providing a capacitor charging apparatus including a DC/DC converter for stepping up the voltage of a battery; a capacitor charged by the DC/DC converter; a detection circuit for determining whether the primary current of the DC/DC converter reaches a predetermined limit current; a control circuit for controlling the DC/DC converter according to a detection signal from the detection circuit; and a battery-information detection circuit for detecting battery information, wherein the control circuit performs a predetermined calculation using battery information from the battery-information detection circuit to determine the predetermined limit current so as to vary the primary current of the DC/DC converter and control the DC/DC converter every time the capacitor is charged by the DC/DC converter.

The capacitor charging apparatus may be configured such that it further comprises a time measuring circuit for measuring the maximum time for which the primary current can be caused to flow, and when the time measuring circuit has counted up to the maximum time before the primary current reaches the predetermined limit current determined by the predetermined calculation, the control circuit controls the DC/DC converter using a count-up signal.

In the capacitor charging apparatus, the count-up signal of the time measuring circuit may correspond to a calculated value not exceeding the saturation current of an oscillating transformer in the DC/DC converter, related to the internal resistance of the battery, or to a determined fixed value not exceeding the saturation current of the oscillating transformer.

In the capacitor charging apparatus, the DC/DC converter may be a flyback converter.

In the capacitor charging apparatus, the battery information may be the no-load voltage of the battery, or a voltage obtained at a predetermined load.

In the capacitor charging apparatus, the predetermined limit current may be calculated according to the internal resistance of the battery, obtained from the battery information.

In the capacitor charging apparatus, the control circuit may comprise a microcomputer which includes an A/D converter and a D/A converter that outputs the predetermined limit current.

In another aspect, an object of the present invention is achieved by providing an electronic flash (stroboscope) apparatus including the above capacitor charging apparatus and a discharge tube which emits light by discharging energy accumulated in the capacitor.

In still another aspect, an object of the present invention is achieved by providing a capacitor charging apparatus including a DC/DC converter for stepping up the voltage of a battery; a capacitor charged by the DC/DC converter; a detection circuit for determining whether the primary current of the DC/DC converter reaches a predetermined value; a control circuit for controlling the DC/DC converter; and a battery check circuit for detecting the state of the battery voltage before a charging operation of the capacitor is started, wherein the control circuit switches control of the DC/DC converter according to the state of the battery voltage detected by the battery check circuit, between a control operation performed according to a detection signal from the detection circuit and a control operation performed according to a signal having a fixed pulse width.

In the capacitor charging apparatus, the control circuit may switch control of the DC/DC converter from a control operation performed according to a detection signal from the detection circuit to a control operation performed according to a signal having a fixed pulse width when the internal resistance of the battery increases or when the battery voltage is reduced to a predetermined voltage or less.

In the capacitor charging apparatus, the primary current of the DC/DC converter, obtained when the DC/DC converter is controlled according to a signal having a fixed pulse width may be lower than that of the DC/DC converter, obtained when the DC/DC converter is controlled according to the detection signal from the detection circuit.

In yet another aspect, an object of the present invention is achieved by providing an electronic flash (stroboscope) apparatus including the above capacitor charging apparatus and a discharge tube which emits light by discharging energy accumulated in the capacitor.

Further objects, features, and advantages of the present invention will become apparent from the following description of the preferred embodiments with reference to the attached drawings.

DESCRIPTION OF THE PREFERRED EMBODIMENTS

Figure 1:
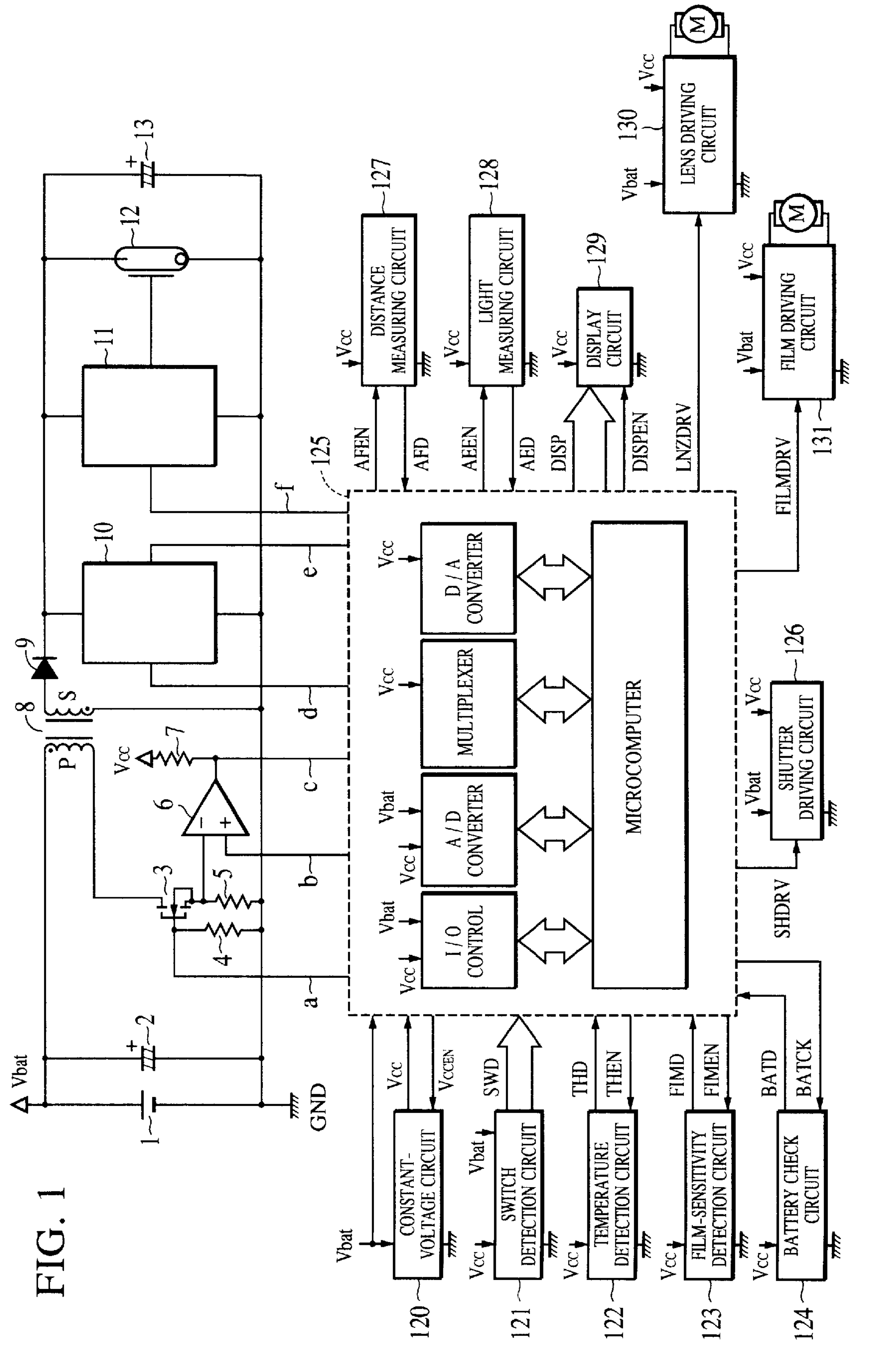
FIG. 1 is a block diagram showing the circuit structure of a camera having an electronic flash (stroboscope) apparatus according to a first embodiment of the present invention.

Embodiments of the present invention will be described below in detail by referring to the drawings.

First embodiment

FIG. 1 is a block diagram showing the circuit structure of a camera having an electronic flash (stroboscope) apparatus according to a first embodiment of the present invention.

The circuit structure of the electronic flash (stroboscope) apparatus will be described first.

The electronic flash (stroboscope) apparatus includes a battery 1 serving as a power supply, a power-supply capacitor 2, a switching device 3, a pull-down resistor 4 used for a control terminal of the switching device 3 and connected between the control terminal and the negative terminal of the battery 1, a resistor 5, a comparator 6 of which a detection terminal is connected as shown in the figure so as to measure the potential of the resistor 5 connected in series to the switching device 3, a resistor 7 for pulling up the output of the comparator 6 to a power-supply voltage Vcc from a constant-voltage circuit described later, an oscillating transformer 8, a high-voltage-rectifying diode 9, a voltage detection circuit 10, a trigger circuit 11, a discharge tube 12, and a main capacitor 13.

The high-voltage-rectifying diode 9 is connected between the secondary winding S of the oscillating transformer 8 and the positive terminal of the main capacitor 13; and the voltage detection circuit 10, the trigger circuit 11, and the discharge tube 12 are connected in parallel with the main capacitor 13.

Connection lines “a” to “f” connect the electronic flash (stroboscope) apparatus to a control circuit 125 of the camera, described later. A connection line “a” is connected to the control terminal of the switching device 3. A connection line “b” is connected to an positive input terminal of the comparator 6 and is also connected to a D/A converter in the control circuit 125. A connection line "c" is connected to the output of the comparator 6. A connection line "d" is used for a driving signal for detecting a voltage. The output signal of the voltage detection circuit 10 is input to the control circuit 125 of the camera through a connection line "e", and the control circuit 125 detects the voltage of the charged main capacitor 13. A connection line "f" sends an activation signal for operating the trigger circuit 11 which makes the discharge tube 12 emit light.

The structure of a camera control system will be described next.

The control circuit 125 of the camera is formed of a microcomputer which includes an A/D converter and a D/A converter. A constant-voltage circuit 120 is controlled by the control circuit 125 through a VCCEN terminal, and sends a power voltage Vcc to each circuit. A switch detection circuit 121 is operated by a battery or the power voltage Vcc to send the state and change of each switch to the control circuit 125 through an SWD line. A temperature detection circuit 122 enables a THEN line and sends temperature data to the control circuit 125 through the THD line. A film-sensitivity detection circuit 123 for obtaining film sensitivity (and information such as the number of frames) enables an FIMEN line, and sends film information to the control circuit 125 through an FIMD line. A battery check circuit 124 is activated through a BATCK line and sends necessary data (battery information) through a BATD line to the control circuit 125 in order to check whether the remaining amount of the battery is sufficient for taking photographs.

A shutter driving circuit 126 controls an SHDRV line to control a shutter. A distance measuring circuit 127 sends to the control circuit 125 distance data to an object through an AFD line in response to an AFEN enable signal. A light measuring circuit 128 measures the luminance of the object in response to an enable signal on an AEEN line and sends luminance information to the control circuit 125 through an AED line. A display circuit 129 displays necessary information, for example, on an LCD. A lens driving circuit 130 for driving a lens controls an LNZDRV line to drive an image-pickup lens. A film driving circuit 131 feeds film under the control of the control circuit 125 through a FILMDRV line.

The operation of main portions in the above structure will be described next by referring to a flowchart shown in FIG. 2.

It is assumed here that the power supply of the control circuit 125 has already been turned on, and the microcomputer in the control circuit 125 has entered a low-power-consumption mode and its operation is halted.

When the switch detection circuit 121 determines that the power switch has already been turned on, the control circuit 125 starts operating and sends a signal through the VCCEN line to the constant-voltage circuit 120. Then, the constant-voltage circuit 120 sends a constant-voltage power Vcc which is, for example, obtained by stepping up or stepping down the voltage of the battery, to each circuit.

A description will be given according to the flowchart shown in FIG. 2. The control circuit 125 (microcomputer) first specifies initial settings of flags required for the following operation in step #1. Then, the control circuit 125 operates the switch detection circuit 121 in step #2. The switch detection circuit 121 determines whether a switch SW1 which is turned on by half pressing a release button (not shown) for preparing for taking a photograph is on in step #3. If the switch SW1 is not on, steps #2 and #3 are repeated until the switch SW1 is turned on. When the switch SW1 is on, the control circuit 125 resets a predetermined counter to an initial state in step #4. Then, the control circuit 125 drives the battery check circuit 124, shown in FIG. 1, through the BATCK line to obtain battery information through the BATD line in step #5. The control circuit 125 determines from the battery information whether the battery 1 is in a power-supply state required for taking photographs by the camera, in step #6. If the battery 1 is not in an appropriate state, the processing returns to step #2.

When the control circuit 125 determines that the battery 1 is in an appropriate state, then it sends a signal through the AFEN line to operate the distance measuring circuit 127 to measure the distance to an object in step #7. The control circuit 125 receives distance information obtained in this step through the AFD line. Next, the control circuit 125 sends an enable signal to the light measuring circuit 128 through the AEEN line to measure the luminance of the object in step #8. The control circuit 125 obtains luminance data obtained in this step through the AED line. The control circuit 125 determines from the obtained luminance data whether the luminance of the object is lower than a predetermined luminance in step #9. If the luminance of the object is lower than the predetermined luminance, the processing proceeds to step #10 to enter a flash mode.

Operations in the flash mode, executed in step #10, will be described below by referring to a flowchart shown in FIG. 3.

The control circuit 125 enables the BATCK line for the battery check circuit 124 to check the state of the battery in step #99. In this step, for example, the internal resistance of the battery is obtained by a constant-current circuit such as that shown in FIG. 4A or by the use of a known resistor such as that shown in FIG. 4B. Each case will be described below in detail.

Figure 4A:
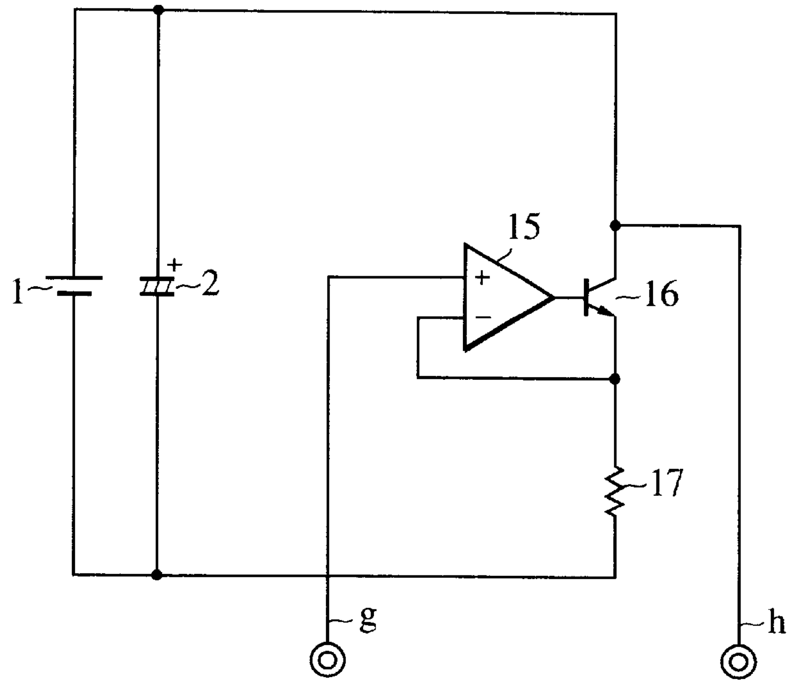
FIG. 4A and FIG. 4B are circuit diagrams of battery check circuits according to the first embodiment of the present invention.

In FIG. 4A, a known constant-current circuit is formed of the battery 1, shown in FIG. 1, the power-supply capacitor 2, shown in FIG. 1, a comparison circuit 15, a transistor 16, and a current detection resistor 17. A reference voltage Eref is given through a connection line "g" (not shown in FIG. 1), and a voltage signal (battery information) is sent to the A/D converter of the control circuit 125 through a connection line "h" (not shown in FIG. 1).

In the above structure, when the reference voltage Eref is given from the control circuit 125 through the connection line "g," the voltage is input to a non-inverted input terminal of the comparison circuit 15. The output of the comparison circuit 15 becomes high, a base current flows through the transistor 16, and the transistor 16 is turned on. When a voltage drop generated by the current detection resistor 17 becomes Eref, the output of the comparison circuit 15 becomes zero, and a constant current flows due to this current balance. If the resistance R17 of the resistor 17 is known, the constant current I0 is obtained by the following equation.

$$I0=Eref/R17$$

When the no-load voltage E0 of the battery obtained before the constant current I0 flows, and a voltage Ei obtained at a constant-current load are detected, the internal resistance Rbat of the battery 1 is obtained by the following equation.

$$Rbat=(E0-Ei)/I0$$

Figure 4B:
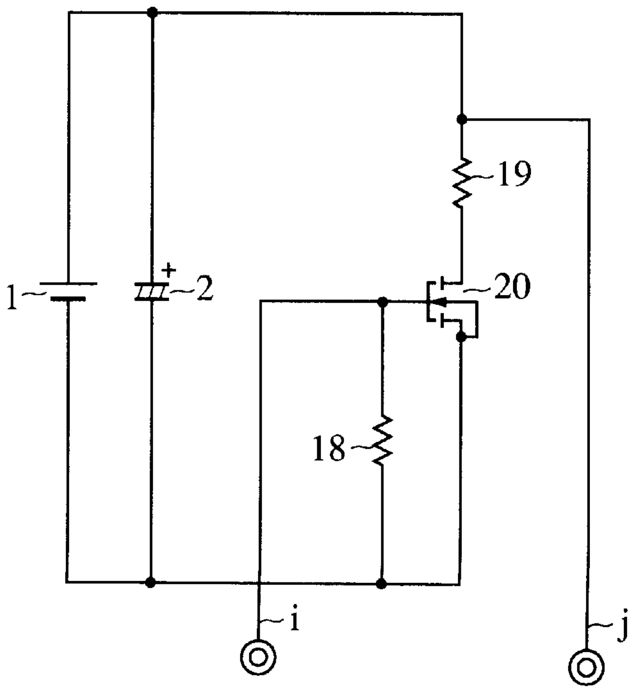

A circuit structure shown in FIG. 4B will be described next. In FIG. 4B, the circuit is formed of the battery 1, shown in FIG. 1, the power-supply capacitor 2, shown in FIG. 1, a switching device 20, a pull-down resistor 18, and a load resistor 19. When a high-level voltage signal is sent through a connection line "i" (not shown in FIG. 1) by the control circuit 125, the switching device 20 is turned on. A voltage obtained at the load of the resistor 19 is sent to the control circuit 125 through a connection line "j" (not shown in FIG. 1). The A/D converter of the control circuit 125 receives it as battery information. The internal resistance Rbat of the battery, is obtained by the following equation.

$$Rbat=(E0/Er-1)*R19$$

where Er indicates a voltage obtained at the load of the resistor 19 and E0 indicates a no-load voltage obtained when the switching device 20 is not turned on.

Methods for obtaining the internal resistance Rbat of the battery 1 are not limited to the above cases.

Figure 3:
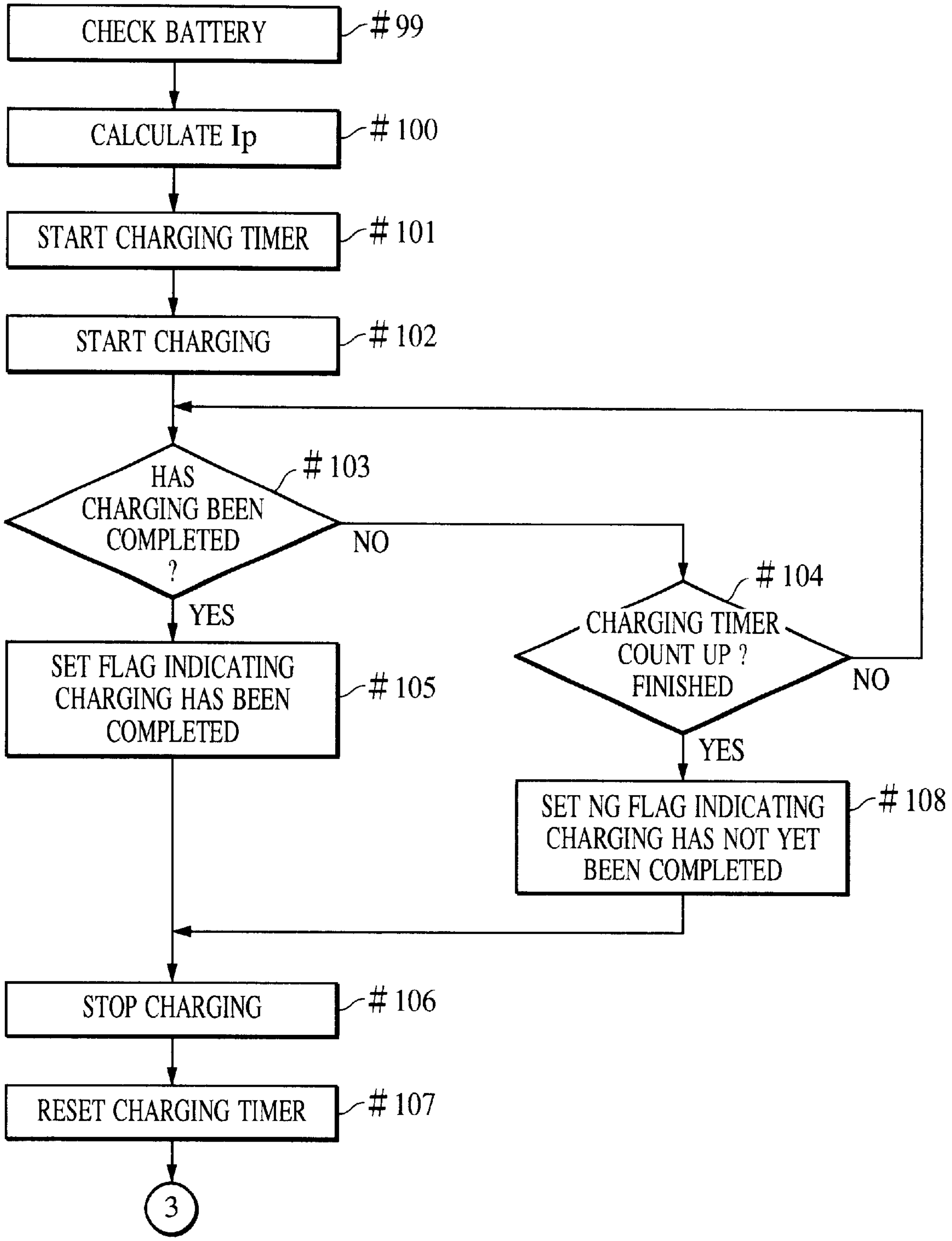
FIG. 3 is a flowchart of detailed operations in a flash mode according to the first embodiment of the present invention.

Back to FIG. 3, the internal resistance of the battery 1 has been obtained from the battery information by the battery check circuit 124 in step #99. Then, the limit current (cut-off current) Ip of the primary current of the oscillating transformer 8 is determined from the battery information of the battery 1 in step #100.

The current-flowing time "t" of the switching device 3 has the following relationship with the primary current of the oscillating transformer 8.

$$I=E0/(Rbat+Rloop)*[1-exp\{-(Rbat+Rloop)*t/L\}]$$

where E0 indicates the no-load voltage of the battery 1, Rbat indicates the internal resistance of the battery 1, Rloop indicates the resistance of a primary-current loop other than the internal resistance of the battery, and L indicates the primary inductance of the oscillating transformer 8.

Figure 5:
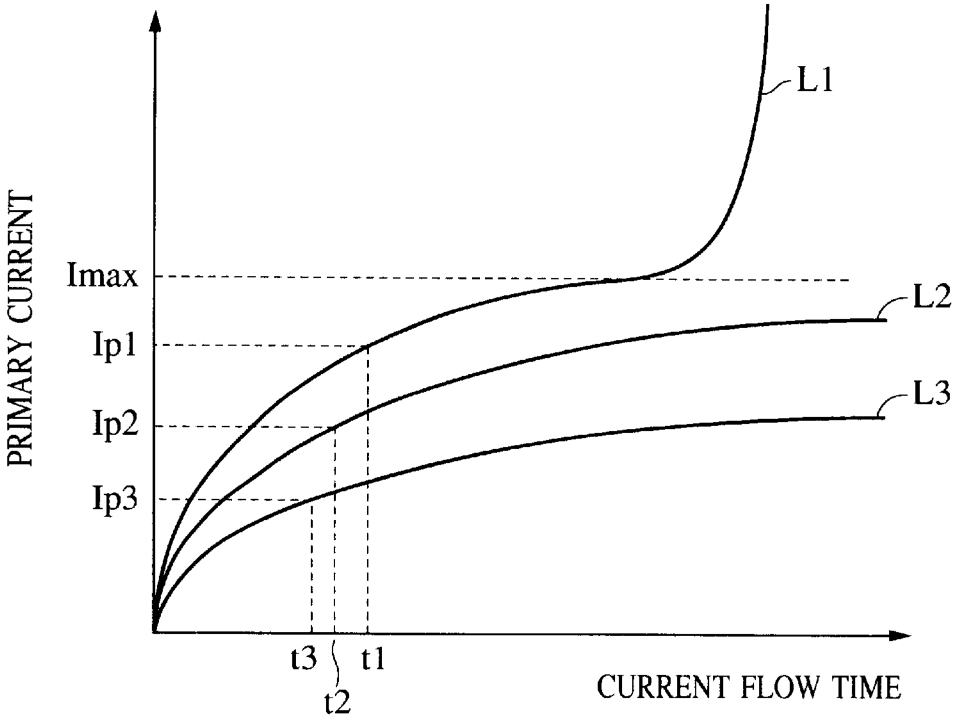
FIG. 5 is a view showing current waveforms used in the description of the first embodiment of the present invention.

FIG. 5 shows the relationship between the current-flow time of the switching device 3 and the primary current of the oscillating transformer 8.

A curve L1 indicates the relationship between the current-flow time "t" and the primary current for a new battery. In the oscillating transformer, the primary current is saturated at Imax.

Curves L2 and L3 indicate current waveforms obtained when the battery is partially consumed. If the saturation of the oscillating transformer or other factors do not have any significant affect, the relationship between the current-flow time "t" and the primary current is generally indicated by the following equation:

$$I=E0/(Rbat+Rloop)*[1-exp\{-(Rbat+Rloop)*t/L\}]$$

In this equation, the maximum current is determined by the no-load voltage E0, the battery resistance Rbat, and the loop resistance Rloop. When the limit current Ip (Ip1 to Ip3) is set to 70% of the maximum current, for example, the non-inverted input of the comparison circuit 6 shown in FIG. 1 needs to be specified such that the limit current Ip satisfies the following equation:

$$Ip=0.7*E0/(Rbat+Rloop)$$

Therefore, the threshold voltage determined by the following equation needs to be sent through the connection line "b" shown in FIG. 1:

$$Eref=R5*0.7*E0/(Rbat+Rloop)$$

where R5 indicates the resistance of the resistor 5. In this case, since the variation of the current-flow time "t" (t1 to t3) is determined by the following equation, $$exp\{-(Rbat+Rloop)*t/L\}=0.3$$

the current-flow time is approximately indicated by the following equation:

$$t=1.2*L/(Rbat+Rloop)$$

where Rbat indicates the internal resistance of the battery 1, L indicates the primary inductance of the oscillating transformer 8, and Rloop indicates the loop resistance other than the internal resistance of the battery 1.

Referring back to FIG. 3, as described above, Ip (Ip1 to Ip3) is obtained and the threshold is determined in step #100. Then, to start a charging timer used to stop charging when a charging time becomes too long, which is, for example, set to about 10 to 15 seconds, in step #101 and to start charging, the control circuit 125 shown in FIG. 1 sends a high-level signal to the control electrode of the switching device 3 through the connection line "a" and sends a high-level signal through the connection line "d" to operate the detection circuit 10, which detects the voltage of the main capacitor 13. The control circuit 125 receives the voltage of the charged main capacitor 13 through the connection line "e" and detects it by the internal A/D converter.

When a high-level signal is sent to the switching device 3, it is turned on and a primary current flows from the battery 1 through the primary winding P of the oscillating transformer 8 and the detection resistor 5.

When the potential generated across the resistor 5 by the primary current reaches the threshold Eref given to the non-inverted input terminal of the comparison circuit 6, the output of the comparison circuit 6 is changed from a high level to a low level, and this signal is sent to the control circuit 125 through the connection line "c." In response to this signal, the control circuit 125 changes the control signal sent through the connection line "a" from the high level to the low level to turn off the switching device 3. The primary current of the oscillating transformer 8 is interrupted. When the primary current of the oscillating transformer 8 is interrupted, energy accumulated by the oscillating transformer 8 is discharged from the secondary winding S through the diode 9 and the main capacitor 13. The main capacitor 13 is charged by this energy. When a predetermined time elapses after the secondary current starts to flow, the control circuit 125 again send a high-level signal to the switching device 3 through the connection line "a" to turn on the switching device 3. The primary current then again flows. The above operation is repeated to charge the main capacitor 13 in step #102.

Charging is performed as described above. Next, the control circuit 125 determines whether the voltage of the main capacitor 13 reaches a voltage to be obtained when charging is completed, in step #103. When the voltage has not yet been reached, it is determined whether counting has been finished in the charging timer in step #104. When counting has not yet been finished, the processing returns to step #103. When counting has been finished, an NG flag indicating that charging has not yet been completed is set in step #108, the signals sent through the connection lines "a" and "b" are set to the low level to stop charging in step #106, the charging timer is reset in step #107, and the processing returns to the main routine shown in FIG. 2 and step #11 and subsequent steps are performed.

Figure 2:
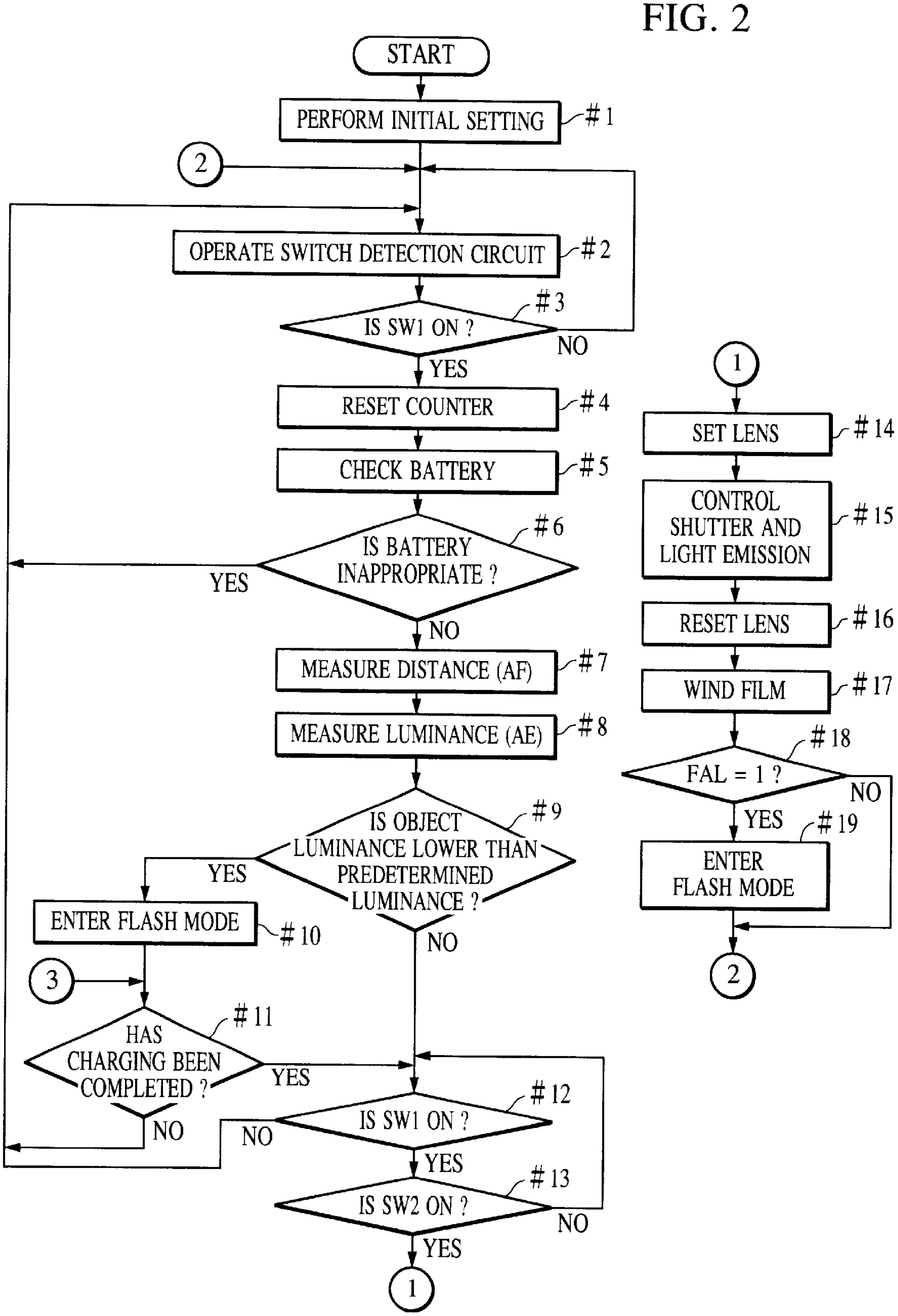
FIG. 2 is a flowchart of the operations of main portions of the camera shown in FIG. 1.

When it is determined in step #103 that charging has been completed before counting is finished in the charging timer, a flag indicating that charging has been completed is set in step #105, the signals sent through the connection lines "a" and "b" are set to the low level to stop charging in step #106, the charging timer is reset in step #107, and the processing returns to the main routine shown in FIG. 2 and step #11 and subsequent steps are performed.

Back to the flowchart shown in FIG. 2, the flash mode has been finished as described above, and the processing proceeds to step #11. The flag set in step #105 in FIG. 3 or the flag set in step #108 in FIG. 3 is checked in this step. When charging has not yet been completed, the processing returns to step #2. When charging has been completed (YES is obtained in step #11), the states of the switch SW1 and the switch SW2 are checked in steps #12 and #13. When the switch SW1 is off (NO is obtained in step #12), the processing returns to step #2. When the switch SW2 is off (NO is obtained in step #13), the processing returns to step #12.

When both switches SW1 and SW2 are on (YES is obtained both in steps #12 and #13), the control circuit 125 controls the lens driving circuit 130 according to the distance data obtained in step #7 to perform focus adjustment, namely, to set the lens in step #14. Then, the control circuit 125 controls a shutter opening through the shutter driving circuit 126 according the luminance of the object obtained in step #8 and film-sensitivity data, and, when the luminance is low and the electronic flash (stroboscope) apparatus is required, the control circuit 125 controls the shutter according to the distance data and the film sensitivity to make the electronic flash (stroboscope) apparatus emit light with an appropriate aperture in step #15.

A high-level signal is sent through the connection line "f" shown in FIG. 1 to make the electronic flash (stroboscope) apparatus emit light. When a high-level signal is sent through the connection line "f," a high pulse voltage is generated at the output of the trigger circuit 11 and is applied to the trigger electrode of the discharge tube 12 to excite the discharge tube 12. This excitation makes the impedance of the discharge tube 12 lower suddenly. The energy accumulated in the main capacitor 13 is discharged and converted to optical energy to illuminate the object. When the electronic flash (stroboscope) apparatus is used, a flash flag FAL is set to "1."

When the shutter driving circuit 126 closes the shutter, the control circuit 125 controls the lens driving circuit 130 to return the lens from its focal point to the initial position, namely, to reset the lens, in step #16. Then, the control circuit 125 controls the film driving circuit 131 to wind the film by one frame in step #17.

Next, the control circuit 125 checks whether the flash flag indicating that the electronic flash (stroboscope) apparatus has been used is "1" in step #18. When the flash flag is "1," the mode is changed to the flash mode, the main capacitor 13 is charged in step #19 in the same way as in step #10, the processing returns to step #2, and a series of sequence is finished. When the electronic flash (stroboscope) apparatus is not used, step #19 is skipped, the processing returns to step #2, and the series of sequence is finished.

Figure 6:
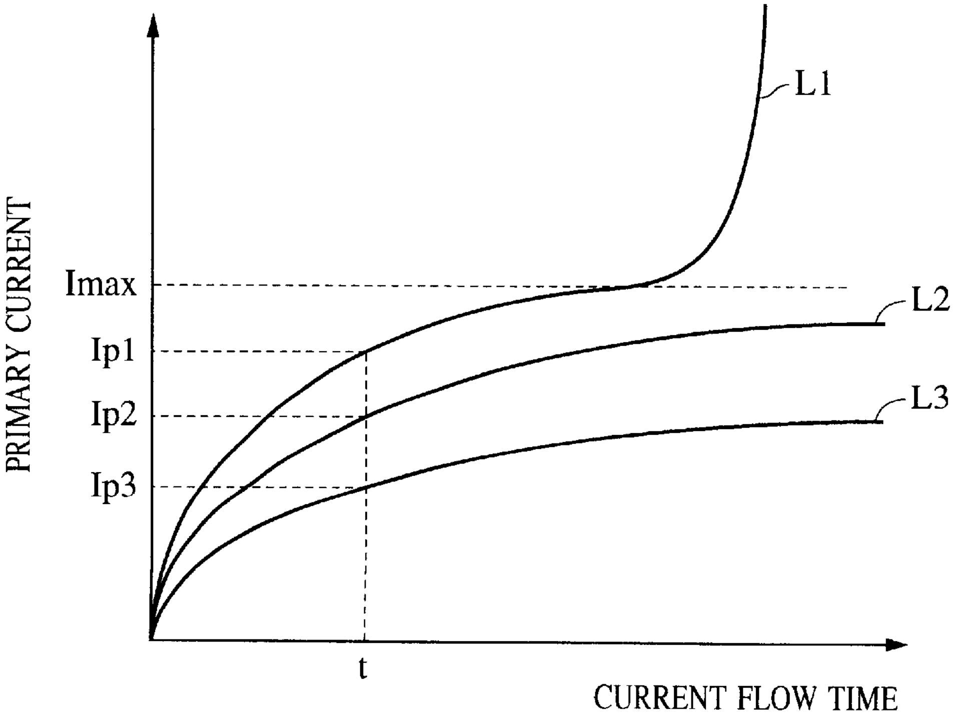
FIG. 6 is a view showing other current waveforms used in the description of the first embodiment of the present invention.

In the foregoing description, the current-flow time "t" (t1 to t3) of the switching device 3 corresponds to 70% of the maximum current. As shown in FIG. 6, the current-flow time "t" may be set constant and calculated from the equation indicating the relationship between the current-flow time "t" and the primary current, although this calculation is complicated. In either case, the primary current is controlled so as not to exceed the saturation current Imax.

In the foregoing description, the period for which the secondary current flows is set to a predetermined time. The primary current may be caused to flow when the secondary current is monitored and becomes zero.

Second embodiment

Figure 7:
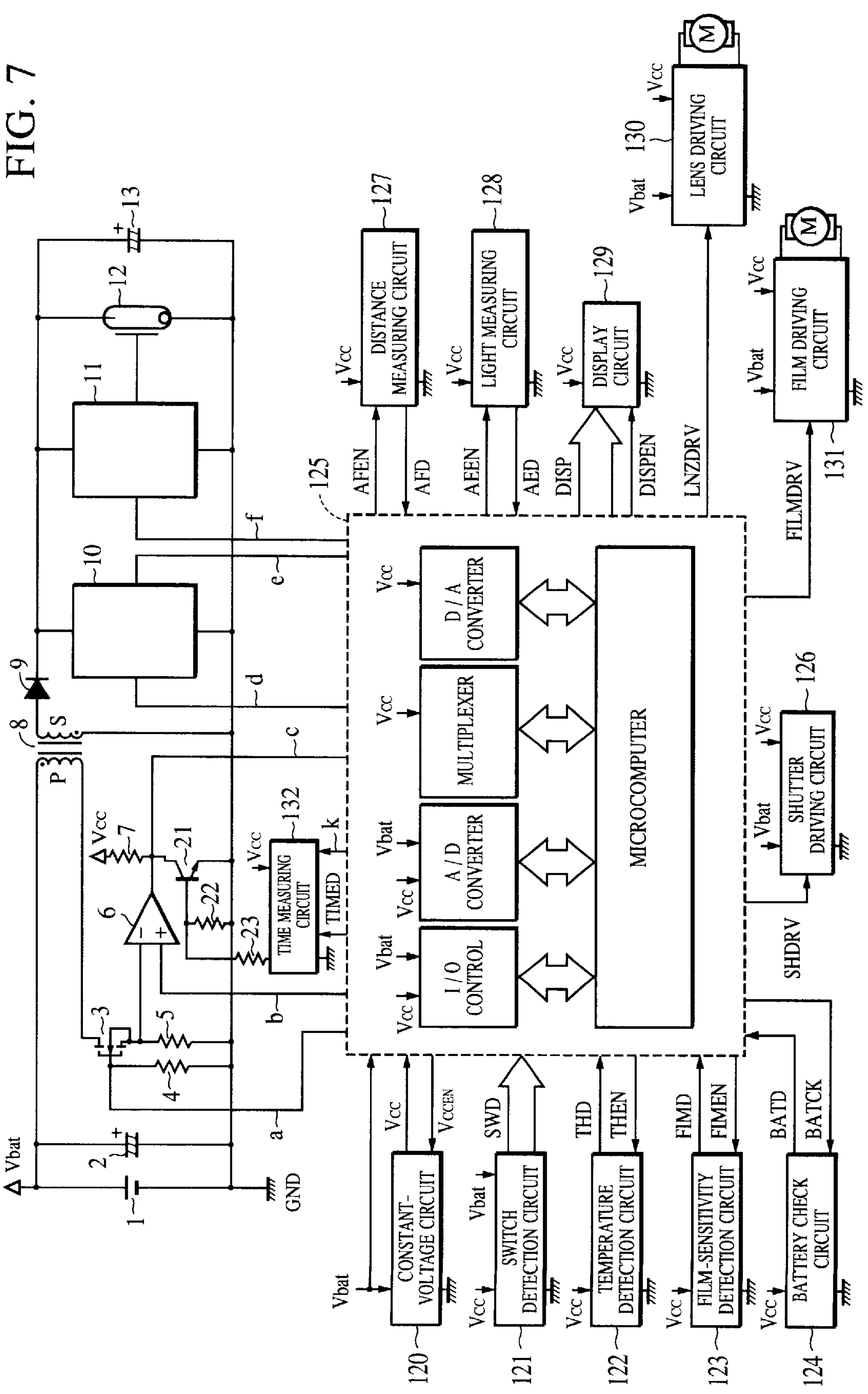
FIG. 7 is a block diagram showing the circuit structure of a camera having an electronic flash (stroboscope) apparatus according to a second embodiment of the present invention.

FIG. 7 is a block diagram showing the circuit structure of a camera having an electronic flash (stroboscope) apparatus according to a second embodiment of the present invention. The same symbols as those used in FIG. 1 are assigned to the same portions as those shown in FIG. 1, and descriptions thereof are omitted.

In an electronic flash (stroboscope) apparatus shown in FIG. 7, the collector of a transistor 21 is connected to the output of a comparison circuit 6, a resistor 22 is connected between the base and the emitter of the transistor 21, and the emitter of the transistor 21 is connected to the negative terminal of a battery 1. There are also shown a resistor 23 and a time measuring circuit 132.

A control circuit 125 inputs an activation signal to the time measuring circuit 132 through a connection line "k." A TIMED line for setting a time to be measured is provided between the control circuit 125 and the time measuring circuit 132. The output of the time measuring circuit 132 is input to the base of the transistor 21 through the resistor 23.

The second embodiment differs from the first embodiment in that the time measuring circuit 132 is provided in order to further limit a current-flow time, in addition to the current-detection comparison circuit 6 for current restriction.

An operation related to a flash mode in the above structure will be described below by referring to a flowchart shown in FIG. 8. The other operations are the same as those in the first embodiment, and descriptions thereof are omitted.

Figure 8:
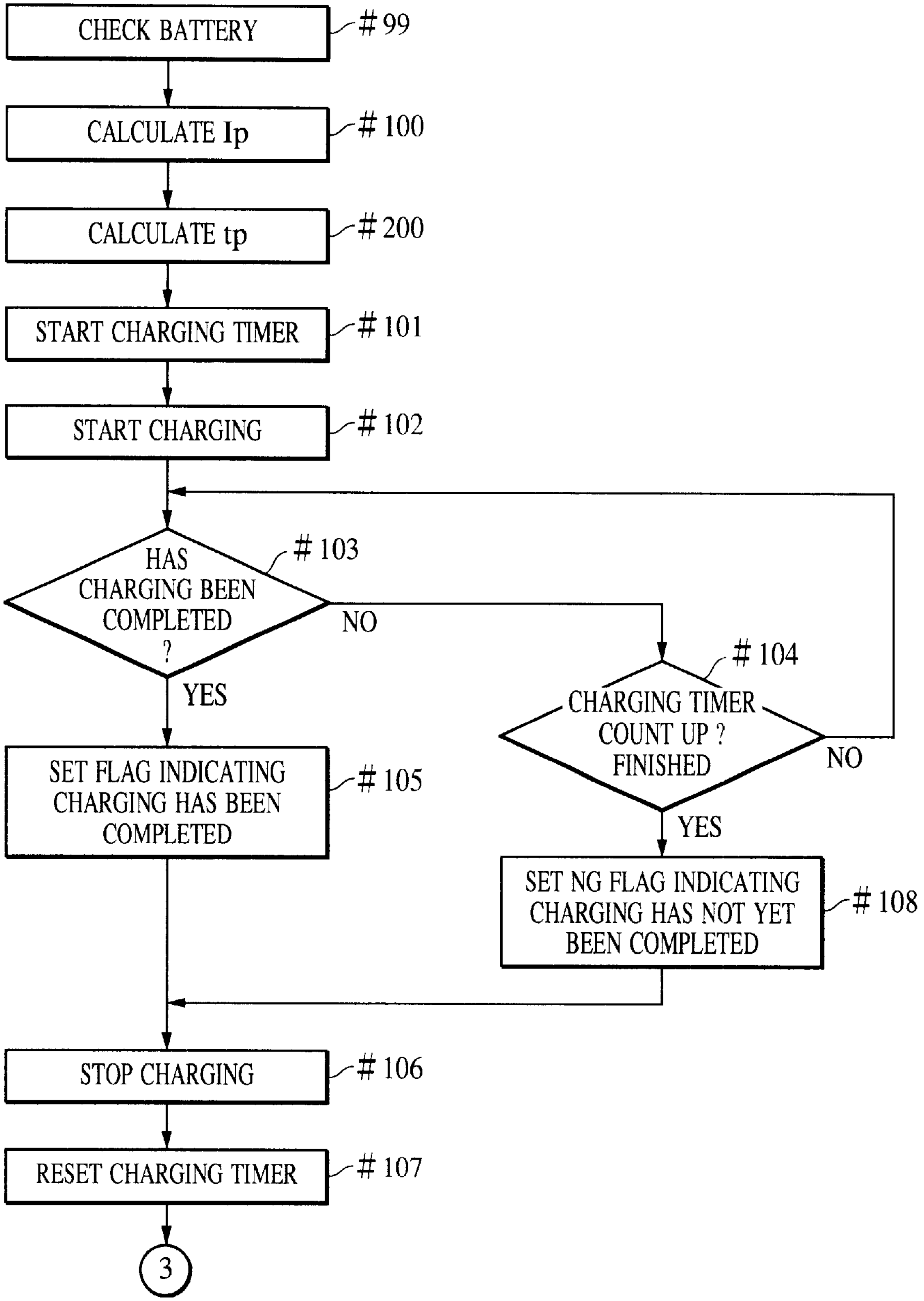
FIG. 8 is a flowchart of detailed operations in a flash mode according to the second embodiment of the present invention.
Figure 9:
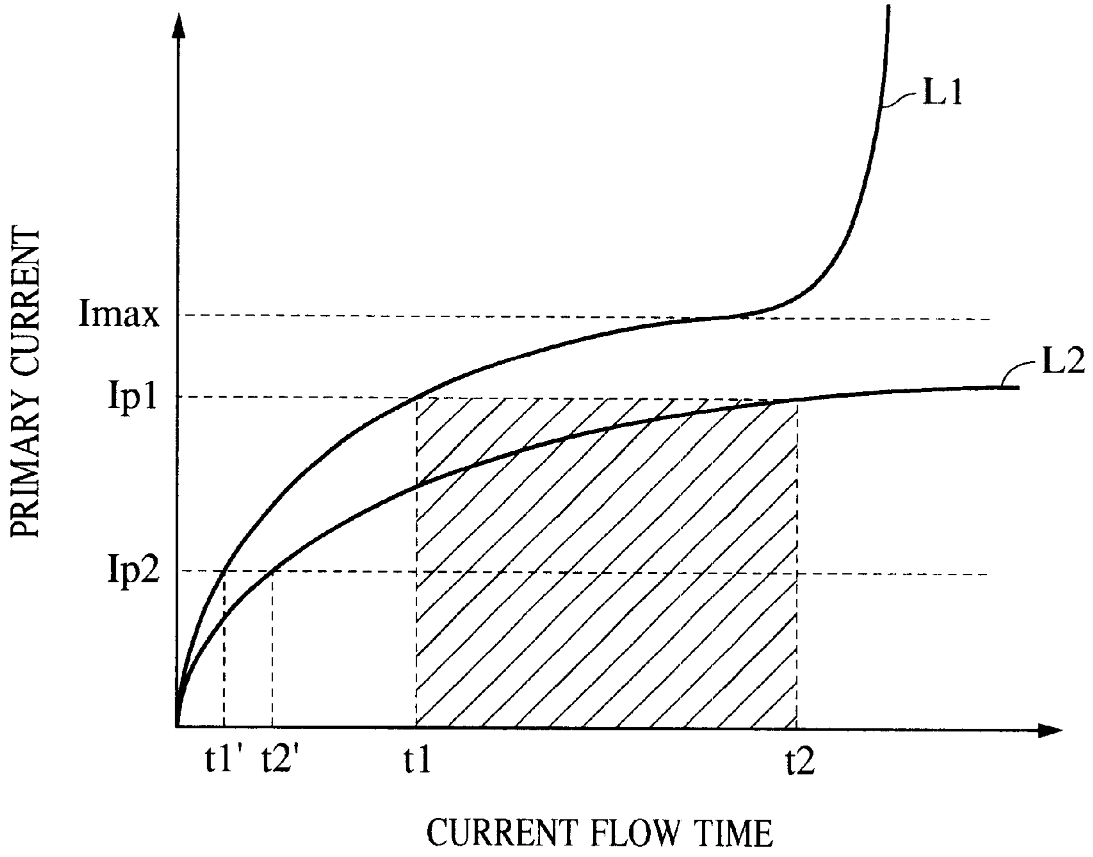
FIG. 9 is a view showing conventional current waveforms.

In FIG. 8, the control circuit 125 first enables a BATCK line for a battery check circuit 124 to check the state (battery information) of the battery. The internal resistance of the battery is obtained as in the first embodiment.

When a constant-current load is used, the internal resistance Rbat of the battery 1 is obtained by the following equation.

$$Rbat=(E0-E1)/I0$$

where E0 indicates the no-load voltage E0 of the battery obtained before the constant current I0 flows and Ei indicates a voltage obtained at a constant-current load. When a resistor load is used, the internal resistance Rbat of the battery is obtained by the following equation in the same way as in the first embodiment.

$$Rbat=(E0/Er-1)*R19$$

where Er indicates a resistor-load (R19) voltage and E0 indicates a no-load voltage.

As described above, the internal resistance of the battery 1 has been obtained from the battery information by the battery check circuit 124 in step #99.

Next, a limit current Ip of the primary current of an oscillating transformer 8 is determined from the battery information of the battery 1. The current-flow time "t" of a switching device 3 has the following relationship with the primary current of the oscillating transformer 8.

$$I=E0/(Rbat+Rloop)*[1-exp\{-(Rbat+Rloop)*t/L\}]$$

where E0 indicates the no-load voltage of the battery, Rbat indicates the internal resistance of the battery, Rloop indicates the resistance of a primary-current loop other than the internal resistance of the battery, and L indicates the primary inductance of the oscillating transformer 8. When the limit current Ip is set to 70% of the maximum current, for example, the non-inverted input of the comparison circuit 6 shown in FIG. 7 needs to be specified such that the limit current Ip satisfies the following equation.

$$Ip=0.7*E0/(Rbat+Rloop)$$

Therefore, the threshold voltage determined by the following equation needs to be sent through a connection line "b" shown in FIG. 7.

$$Eref=R5*0.7*E0/(Rbat+Rloop)$$

where R5 indicates the resistance of the resistor 5.

As described above, the limit current Ip is specified to determine the threshold in step #100.

Then, a time limit tp is specified, which is a feature of the second embodiment.

Theoretically, the primary current reaches the limit current Ip for about the time limit tp. In case the state of the battery 1 is changed during charging and the internal resistance Rbat increases, charging is restricted by the time limit tp.

When the limit current Ip is set to 70% of the maximum current in the same way as in the first embodiment, the variation of the current-flow time "t" is determined by the following equation, $$exp\{-(Rbat+Rloop)*t/L\}=0.3$$

and the current-flow time is approximately indicated by the following equation.

$$t=1.2*L/(Rbat+Rloop)$$

where Rbat indicates the internal resistance of the battery 1, L indicates the primary inductance of the oscillating transformer 8, and Rloop indicates the loop resistance other than the internal resistance of the battery 1.

In the second embodiment, this value is used as the time limit tp. In case the battery state is changed, the internal resistance increases, and the potential of the current detection resistor 5 does not reach the non-inverted input Eref of the comparison circuit 6, control is possible by the time measuring circuit 132, which measures the limit time tp. In the present embodiment, the limit time tp is set through the TIMED line in step #200.

Then, to start a charging timer used to stop charging when a charging time becomes long, which is, for example, set to about 10 to 15 seconds, in step #101 and to start charging, the control circuit 125 shown in FIG. 7 sends a high-level signal to the control electrode of the switching device 3 through a connection line "a" and sends a driving signal to the time measuring circuit 132 through the connection line "k" at the same time. The control circuit 125 also sends a high-level signal through a connection line "d" to operate the detection circuit 10, which detects the voltage of a main capacitor 13. The control circuit 125 receives the voltage of the charged capacitor through a connection line "e" and detects it by the internal A/D converter. When a high-level signal is sent to the switching device 3, it is turned on and a primary current flows from the battery 1 through the primary winding P of the oscillating transformer 8 and the detection resistor 5.

When the potential generated across the resistor 5 by the primary current reaches the threshold Eref given to the non-inverted input terminal of the comparison circuit 6, the output of the comparison circuit 6 is changed from the high level to the low level, and this signal is sent to the control circuit 125 through a connection line "c." If the potential generated at the resistor 5 by the primary current does not reach the threshold Eref given to the non-inverted input terminal of the comparison circuit 6 when counting at the time measuring circuit 132 is finished, the output of the time measuring circuit 132 is sent to the base of the transistor 21 through the resistor 23 as a base current. The collector of the transistor 21 makes the output potential of the comparison circuit 6 from the high level to the low level, and this potential is input to the control circuit 125 through the connection line "c." In response to this signal, the control circuit 125 changes the control signal sent through the connection line "a" from the high level to the low level to turn off the switching device 3. The primary current of the oscillating transformer 8 is interrupted. At the same time, the control circuit 125 stops driving the time measuring circuit 132 through the connection line "k," performs an initial reset, and waits for the next driving signal to be input.

When the primary current of the oscillating transformer 8 is interrupted, energy accumulated by the oscillating transformer 8 is discharged from the secondary winding S through the diode 9 and the main capacitor 13. The main capacitor 13 is charged by this energy. When a predetermined time elapses after the secondary current starts to flow, the control circuit 125 again sends a high-level signal to the switching device 3 through the connection line "a" to turn on the switching device 3 to cause the primary current to flow, and at the same time, sends a driving signal to the time measuring circuit 132 through the connection line "k." The above operation is repeated to charge the main capacitor 13 in step #102.

Charging is performed as described above. Next, the control circuit 125 determines whether the voltage of the main capacitor 13 reaches a voltage to be obtained when charging is completed, in step #103. When the voltage has not yet been reached, it is determined whether counting has been finished in the charging timer in step #104. When counting has not yet been finished, the processing returns to step #103. When counting has been finished, an NG flag indicating that charging has not yet been completed is set in step #108, the signals sent through the connection lines "a" and "b" are set to the low level to stop charging in step #106, the charging timer is reset in step #107, and the processing returns to the main routine shown in FIG. 2 and subsequent steps are performed.

When it is determined in step #103 that charging has been completed before counting is finished in the charging timer, a flag indicating that charging has been completed is set in step #105, the signals sent through the connection lines "a" and "b" are set to the low level to stop charging in step #106, the charging timer is reset in step #107, and the processing returns to the main routine shown in FIG. 2 and step #11 and subsequent steps are performed.

As described above, when the limit current Ip is specified and the DC/DC converter is operated, in case the battery state is changed during charging of the main capacitor and the primary current does not reach the limit current Ip, an operation is possible without any inconvenience.

The limit time tp is specified by calculation. It may be set to any value for which the oscillating transformer 8 does not saturate.

Third Embodiment

Figure 10:
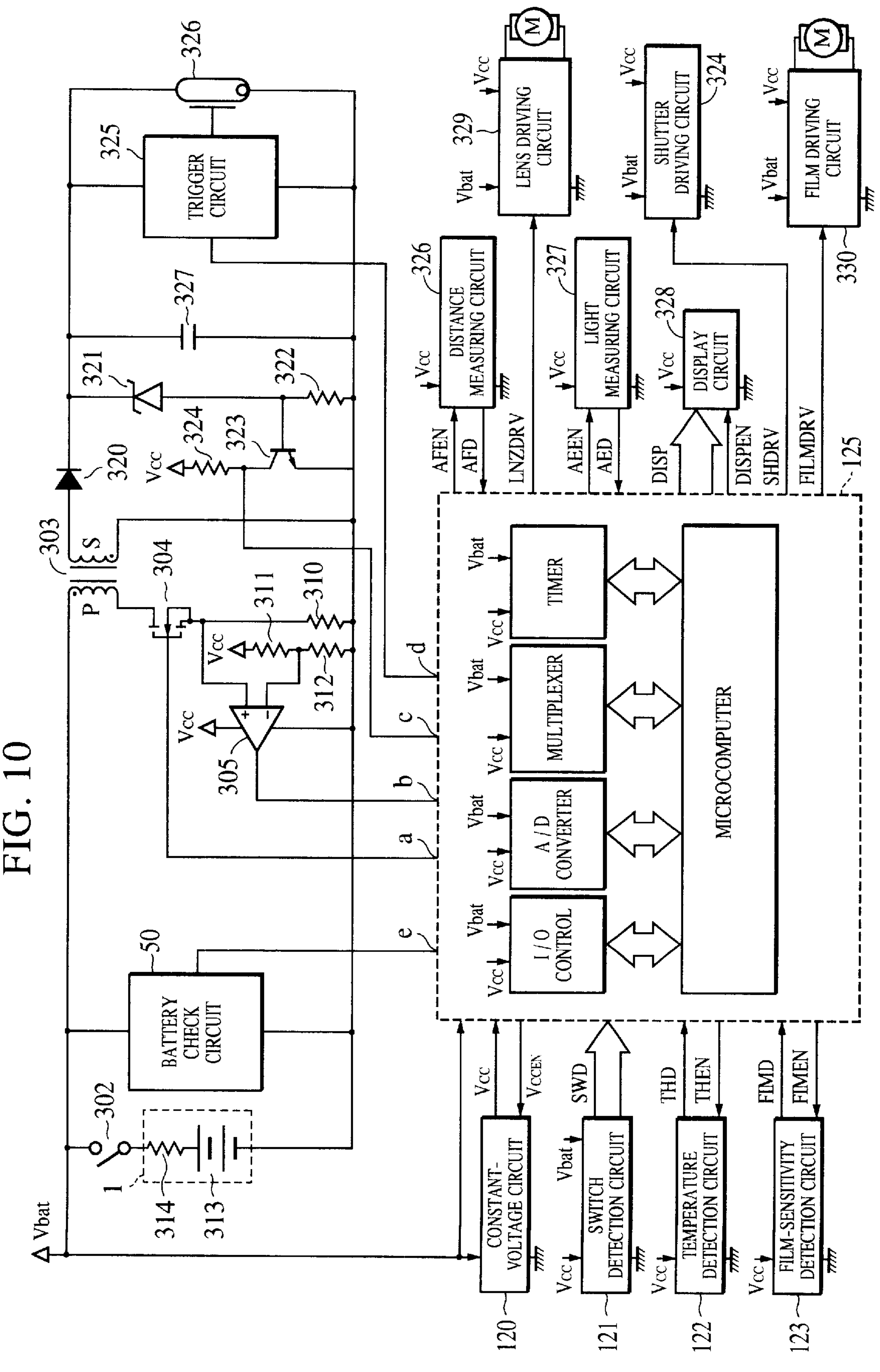
FIG. 10 is a block diagram showing the circuit structure of a camera having an electronic flash (stroboscope) apparatus according to a third embodiment of the present invention.

FIG. 10 is a block diagram showing the circuit structure of a camera having an electronic flash (stroboscope) apparatus according to a third embodiment of the present invention.

The structure of the electronic flash (stroboscope) apparatus will be described first.

The electronic flash (stroboscope) apparatus is formed of a battery 1, which is a block further indicating an equivalent circuit having a battery power supply 313 and an internal resistor 314; a power-supply switch 302; a battery check circuit 50 for detecting the state of the battery; an oscillating FET 304; an oscillating transformer 303 of which one end of the primary winding is connected to the drain of the FET 304 and the other end is connected to the power-supply switch 302; a comparator 305; a main capacitor 327; a diode 320 of which the anode is connected to the secondary winding of the oscillating transformer 303 and the cathode is connected to the main capacitor 327; a detection resistor 310 of which one end is connected to the source of the oscillating FET 304 and also to the positive input terminal of the comparator 305; resistors 311 and 312 of which the connection point is connected to the negative input terminal of the comparator 305; a zener diode 321; a resistor 322; a transistor 323 of which the base is connected to the connection point of a series circuit formed of the zener diode 321 and the resistor 322; a resistor 324; a trigger circuit 325; and a discharge tube 326 which is connected to the output of the trigger circuit 325.

Connection lines "a" to "e" connect between a control circuit 125 of the camera and the stroboscope apparatus. A connection line "a" is connected to the gate of the oscillating FET 304, a connection line "b" is connected to the output terminal of the comparator 305, a connection line "c" is connected to the connection point of the resistor 324 and the collector of the transistor 323, a connection line "d" is connected to the activation terminal of the trigger circuit 325, and a connection line "e" is connected to the control terminal of the battery check circuit 50.

The control system of the camera will be described next.

A constant-voltage circuit 120 is controlled by the control circuit 125 formed of a microcomputer and others, through a VCCEN line, and sends a power voltage Vcc to each circuit. A switch detection circuit 121 is operated by the battery or the power voltage Vcc to send the state and change of each switch to the control circuit 125. A temperature detection circuit 122, a film-sensitivity detection circuit 123 for obtaining film sensitivity (and information such as the number of frames), a distance measuring circuit 326, and a light measuring circuit 327 send necessary information to the control circuit 125 through signal lines. A shutter driving circuit 324 drives a shutter. A lens driving circuit 329 drives a lens. A film driving circuit 330 feeds film and is operated by the control circuit 125. A display circuit 328 displays necessary information on an LCD or the like.

The operation of main portions in the above structure will be described next by referring to a flowchart shown in FIG. 11.

It is assumed here that the power supply of the camera control system has already been turned on, and the microcomputer in the control circuit 125 has entered a low-power-consumption mode and its operation is halted.

When the switch detection circuit 121 determines that the power switch has been turned on, the microcomputer in the control circuit 125 starts operating. The control circuit 125 sends a signal through the VCCEN line to the constant-voltage circuit 120. Then, the constant-voltage circuit 120 sends the power voltage Vcc to each circuit.

A description will be given according to the flowchart shown in FIG. 11. The control circuit 125 (microcomputer) first specifies initial settings of flags required for the following operation in step #1. Then, the control circuit 125 operates the switch detection circuit 121 in step #2. The switch detection circuit 121 waits for a switch SW1 to be turned on by half pressing a release button for preparing to take a photograph in step #3. When the switch SW1 is on, the control circuit 125 uses the battery check circuit 50 to check the battery in step #4. The control circuit 125 determines whether the battery 1 is in a power-supply state required for taking photographs by the camera, in step #5. If the battery 1 is not in an appropriate state, the processing returns to step #2. When the battery voltage is sufficient, the processing proceeds to step #6. Processes performed in steps #6 and #7 will be described later.

When the processes of step #6 and #7 are finished, the control circuit 125 operates the distance measuring circuit 326 to measure the distance to an object in step #8. Then, the control circuit 125 measures the luminance of the object in step #9. The control circuit 125 determines from obtained luminance data whether the luminance of the object is lower than a predetermined luminance in step #10. If the luminance of the object is lower than the predetermined luminance, the control circuit 125 charges the electronic flash (stroboscope) apparatus in step #11. The electronic flash (stroboscope) apparatus is charged according to the processes of steps #6 and #7. The processes of steps #6 and #7 will be described below.

Figure 12:
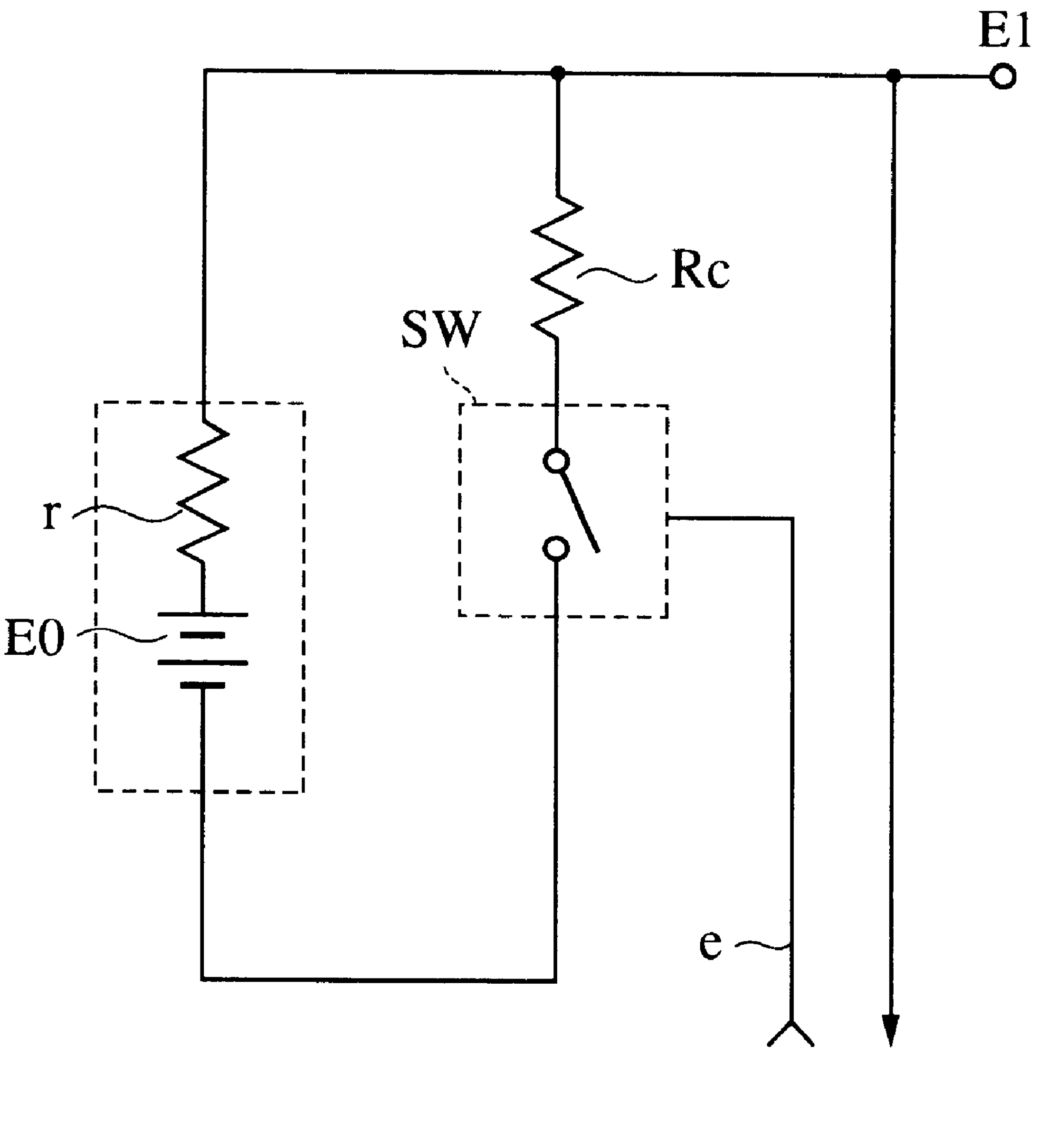
FIG. 12 is a circuit diagram of a battery check circuit shown in FIG. 10.

FIG. 12 shows a detailed example circuit of the battery check circuit 50.

A switch SW is set off and a battery voltage E0 is monitored. Then, the switch is set on by a signal sent through the connection line "e" from the control circuit 125 of the camera to connect a battery-check resistor Rc, and a battery voltage E1 is monitored. In this case, since the resistance of the resistor Rc is known, the internal resistance "r" of the battery is obtained by the following equation.

$$r=(E0-E1)/E1*Rc$$

Any battery-check method may be used if the internal resistance "r" (hereinafter also called Rbat) of the battery and the battery voltage E0 (hereinafter also called Vbat) are obtained.

Referring back to FIG. 11, in step #6, when the battery voltage Vbat is lower than a predetermined voltage V0, or when the internal resistance Rbat of the battery is higher than a predetermined resistance R0, the processing proceeds to step #7. In step #7, a timer (not shown) which operates in synchronization with a signal sent through the connection line "a" is set such that the signal has a fixed on-pulse width T0.

With this operation, control of the flyback converter from ON to OFF is determined by the fixed on-pulse width, not by a current flowing through the oscillating transformer 303.

The processing may proceed to step #7 only when the battery voltage Vbat is lower than the predetermined voltage V0, or only when the internal resistance Rbat of the battery is higher than the predetermined resistance R0. A battery obtained in a case in which the processing proceeds from step #6 to step #7, namely, the battery voltage Vbat is lower than the predetermined voltage V0, or the internal resistance Rbat of the battery is higher than the predetermined resistance R0, is hereinafter called a "partially consumed battery." A battery obtained in a case in which the battery voltage Vbat is higher than the predetermined voltage V0, and the internal resistance Rbat of the battery is lower than the predetermined resistance R0, is hereinafter called a "normal battery."

Operations in step #11, charging the electronic flash (stroboscope) apparatus, will be described in detail by referring to a flowchart shown in FIG. 13.

Figure 13:
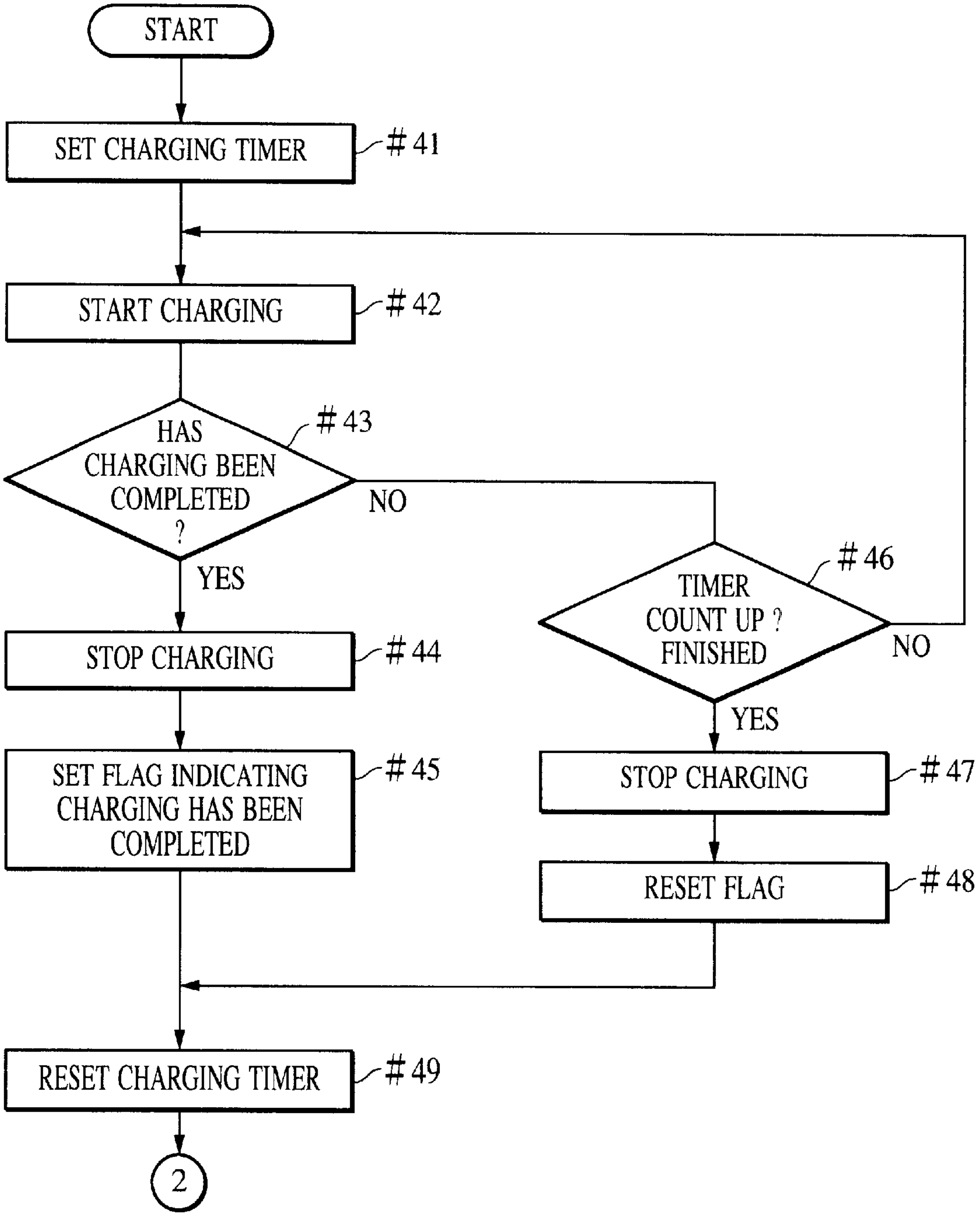
FIG. 13 is a flowchart of charging operations for the electronic flash (stroboscope) apparatus according the third embodiment of the present invention.

In FIG. 13, a charging timer is started in step #41. A predetermined period for charging is generally set to 10 to 15 seconds. Then, the control circuit 125 sends a high-level signal through the connection line "a" to start charging the stroboscope apparatus in step #42.

Charging the stroboscope apparatus with the "normal battery" will be described first by referring to FIG. 10.

In FIG. 10, the high-level signal sent through the connection line "a" is input to the gate of the oscillating FET 304. The oscillating FET 304 obtains an appropriate gate potential and is turned on. Therefore, a drain current flows into the primary winding of the oscillating transformer 303 through a loop formed of the battery 1, the power-supply switch 302, the primary winding of the oscillating transformer 303, the oscillating FET 304, and the resistor 310. When the drain current flows through the primary winding of the oscillating transformer 303, a potential is generated across the resistor 310 by the drain current. When the potential reaches the comparison voltage of the comparator 305, determined by the resistors 311 and 312, the output of the comparator 305 is changed from the low level to the high level, and a high-level signal is input to the control circuit 125 through the connection line "b." Then, a low-level signal is suddenly sent through the connection line "a." The oscillating FET 304 has no appropriate gate potential and is turned off. An electronic flash (stroboscope) charging operation to be performed thereafter is common to that for the partially consumed battery, and will be described later.

Charging the stroboscope apparatus with the "partially consumed battery" will be described next.

In FIG. 10, the high-level signal sent through the connection line "a" is input to the gate of the oscillating FET 304. The oscillating FET 304 obtains an appropriate gate potential and is turned on. Therefore, a drain current flows into the primary winding of the oscillating transformer 303 through a loop formed of the battery 1, the power-supply switch 302, the primary winding of the oscillating transformer 303, the oscillating FET 304, and the resistor 310. A signal having the fixed pulse width T0 is sent through the connection line "a." In other words, after time T0 elapses, a low-level signal is sent through the connection line "a," and the oscillating FET 304 has no appropriate gate potential and is turned off.

The fixed pulse width T0 is specified such that the corresponding current is lower than the battery-current detection level determined by the comparator 305, that is, lower than the detection level used for the "normal battery."

The common charging operation will be described below. When the oscillating FET 304 is turned off as described above, the drain current does not flow. A counterelectromotive force is generated at the primary winding of the oscillating transformer 303, an electromotive force is generated at the secondary winding of the oscillating transformer 303, and energy is accumulated in the main capacitor 327 through the diode 320. When the control circuit 125 is set such that a high-level signal is again sent through the connection line "a" after a constant time, for example, the above operation is repeated and energy is accumulated in the main capacitor 327 through repetition of the above operation.

Figure 14:
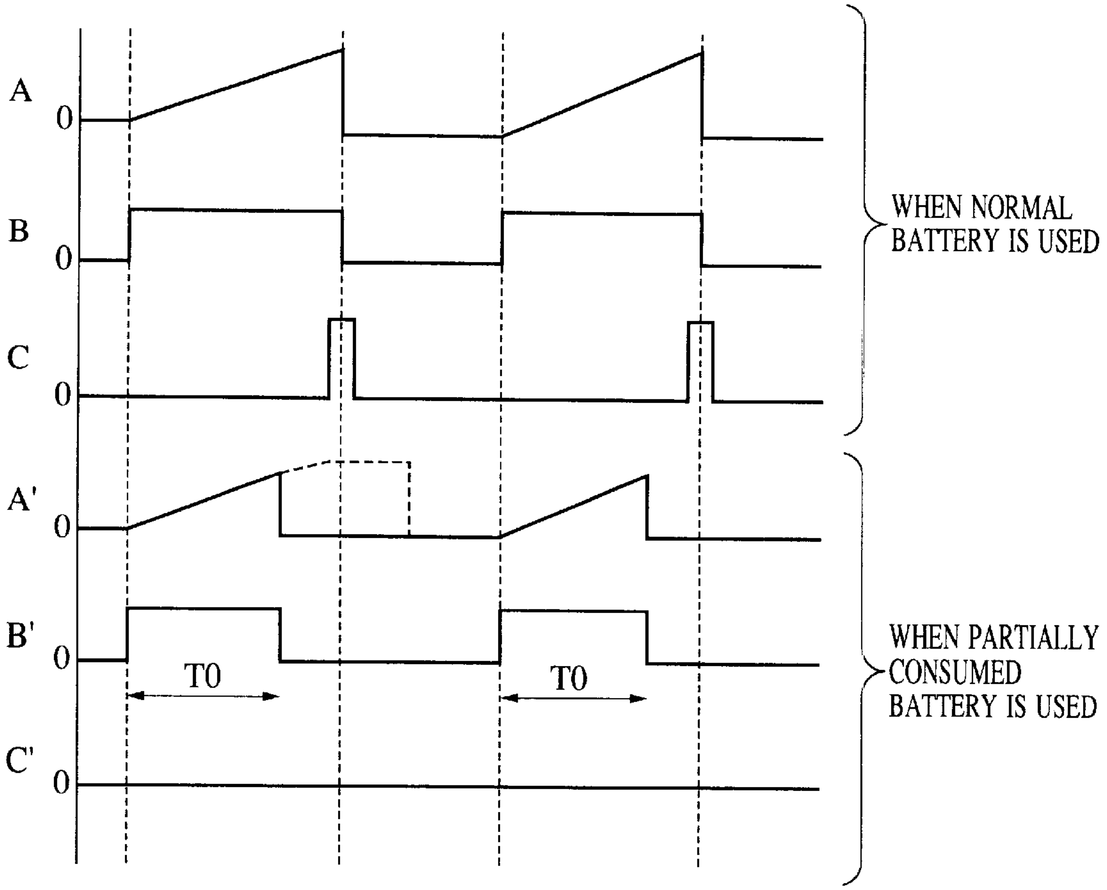
FIG. 14 is a view of waveforms according to the third embodiment of the present invention.
Figure 15:
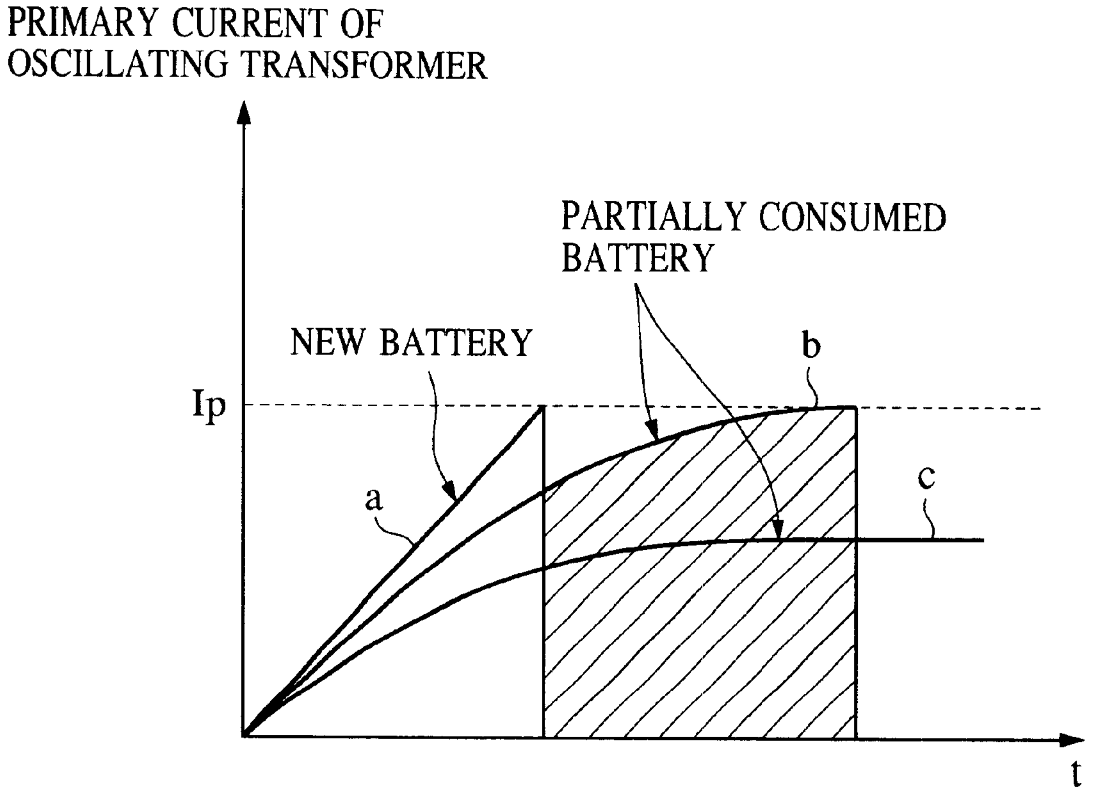
FIG. 15 is a view showing conventional current waveforms.

FIG. 14 shows waveforms obtained during charging.

In FIG. 14, waveforms A and A' indicate currents flowing through the primary winding of the oscillating transformer 303, waveforms B and B' indicate the gate potentials of the oscillating FET 304, and waveforms C and C' indicate the output voltages of the comparator 305. The waveforms A, B, and C indicate those obtained when the "normal battery" is used, and the waveforms A', B', and C' indicate those obtained when the "partially consumed battery" is used.

When current detection is performed with the "partially consumed battery," the current waveform is drooped as indicated by a dotted line in the waveform A'due to a reduction of the battery voltage or an increase of the internal resistance of the battery. Since energy accumulated in the oscillating transformer 303 is proportional to the square of the current flowing through the oscillating transformer 303, energy is hardly accumulated at a portion where the current waveform is drooped, and the portion causes a loss of the DC/DC converter formed of the oscillating transformer 303 and the oscillating FET 304.

Therefore, when the "partially consumed battery" is used, as indicated by a solid line in the waveform A', control of the flyback converter from ON to OFF is performed by a signal having the fixed pulse width T0, instead of by a detection signal generated by the comparator 305, to allow the electronic flash (stroboscope) apparatus to be charged without reducing the efficiency of the DC/DC converter.

When the voltage of the main capacitor 327 increases and exceeds the breakdown voltage of the zener diode 321, a current flows into the zener diode 321 and the resistor 322, and a potential is generated across the resistor 322. This potential turns on the transistor 323, and a low-level signal is sent through connection line "c."

Referring back to the flowchart of charging the electronic flash (stroboscope) apparatus, shown in FIG. 13, operations performed after step #43 will be described below.

The control circuit 125 determines whether a charged-capacitor-voltage detection circuit formed of the zener diode 321, the resistors 322 and 324, and the transistor 323 inputs a low-level signal through connection line "c" to the control circuit 125 in step #43. When a low-level signal is input through connection line "c," which indicates that charging has been completed, the control circuit 125 sends a low-level signal through connection line "a" and stops charging in step #44, and sets a flag indicating that charging has been completed in step #45.

When charging has not been completed within the charging-timer period (step #42, step #43, step #46, step #42, step #43, . . . , and step #46), the control circuit 125 stops charging in step #47, and resets the flag in step #48 to indicate that charging has not yet been completed.

Then, the control circuit 125 resets the charging timer in step #49. Charging the electronic flash (stroboscope) apparatus has been finished, and the processing proceeds to step #12 shown in FIG. 11.

Referring back to FIG. 11, in step #12, the flag set in step #45 in FIG. 13 or reset in step #48 is checked. When charging has not yet been completed, the processing returns to step #2. When charging has been completed, if the switch SW1 is on, the control circuit 125 waits for the switch SW2 (corresponding to a full-pressing operation) to be turned on, in steps #13 and #14.

When the switch SW2 is turned on, the control circuit 125 controls the lens driving circuit 329 according to the distance data obtained in step #8 to perform focus adjustment, namely, to set the lens in step #15. Then, the control circuit 125 controls a shutter opening through the shutter driving circuit 324 according to the luminance of the object obtained in step #9 and film-sensitivity data, and, when the luminance is low and the electronic flash (stroboscope) apparatus is required, the control circuit 125 controls the shutter according to the distance data and the film sensitivity to make the stroboscope apparatus emit light with an appropriate aperture in step #16.

A high-level signal is sent through connection line "d" shown in FIG. 10 to make the electronic flash (stroboscope) apparatus emit light. When a high-level signal is sent through connection line "d" from the control circuit 125, a high-voltage pulse is generated at the output of the trigger circuit 325 and is applied to the trigger electrode of the discharge tube 326 to excite the discharge tube 326. This excitation makes the impedance of the discharge tube 326 lower suddenly. Charges accumulated in the main capacitor 327 are discharged at an instant, and the discharge tube 326 converts this energy to optical energy to emit light.

When the shutter is closed, the control circuit 125 returns the lens from its focal point to the initial position, namely, to reset the lens, in step #17. Then, the control circuit 125 winds the film by one frame in step #18. Next, the control circuit 125 determines whether the electronic flash (stroboscope) apparatus has been used in step #19. When the electronic flash (stroboscope) apparatus has been used, charging is performed in the same way as in step #11, in step #20. When the electronic flash (stroboscope) apparatus has not been used, step #20 is skipped, the processing returns to step #2, and the series of sequence is finished.

According to the above embodiment, when the "partially consumed battery" is used, as indicated by the solid line in the waveform A' shown in FIG. 14, control of the flyback converter from ON to OFF is performed by a signal having the fixed pulse width T0, instead of by a detection signal generated by the comparator 305, to allow the stroboscope apparatus to be charged without reducing the efficiency of the DC/DC converter. In other words, the primary current of the oscillating transformer is prevented from continuing to flow during charging of the electronic flash (stroboscope) apparatus, and in addition, the electronic flash (stroboscope) apparatus can be charged without reducing charging efficiency.

Since a method in which the limit current Ip is appropriately controlled according to the result of battery check is not used, a D/A converter is not required and a simple circuit structure is provided. More specifically, only one means for generating a signal having a fixed pulse width, such as timer means, is needed, and it is implemented by a very simple structure.

In the above embodiment, the oscillating transformer 303 and the oscillating FET 304 correspond to a DC/DC converter according to the present invention; the comparator 305 and the resistors 311 and 312 correspond to detection means according to the present invention; and the camera control circuit 125, which includes the microcomputer, corresponds to control means according to the present invention.

In the above embodiments, a camera having an electronic flash (stroboscope) apparatus is used as an example. The present invention is not limited to such a camera. The present invention can also be applied to an electronic flash (stroboscope) apparatus itself, to a camera system formed of a combination of a camera and an electronic flash (stroboscope) apparatus, and to a capacitor charging apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A capacitor charging apparatus comprising:

a capacitor a DC/DC converter for stepping up the voltage of a battery and charging the capacitor;

a detection circuit that determines whether a primary current of the DC/DC converter reaches a predetermined limit current;

a control circuit that controls the DC/DC converter according to a detection signal received from the detection circuit; and a battery-information detection circuit that detects battery information, wherein the control circuit performs a predetermined calculation using the battery information received from the battery-information detection circuit to determine the predetermined limit current and to vary the primary current of the DC/DC converter so as to control the DC/DC converter each time the capacitor is charged by the DC/DC converter.

2. A capacitor charging apparatus according to claim 1, further comprising a time measuring circuit that measures a maximum time for which the primary current can be caused to flow, and wherein, when the time measuring circuit has counted up to the maximum time before the primary current reaches the predetermined limit current determined by the calculation, the control circuit controls the DC/DC converter in accordance with a count-up signal.

3. A capacitor charging apparatus according to claim 1, wherein the DC/DC converter is a flyback converter.

4. A capacitor charging apparatus according to claim 1, wherein the battery information is the no-load voltage of the battery, or a voltage obtained at a predetermined load.

5. A capacitor charging apparatus according to claim 1, wherein the predetermined limit current is calculated according to the internal resistance of the battery, obtained from the battery information.

6. A capacitor charging apparatus according to claim 1, wherein the control circuit comprises a microcomputer which includes an A/D converter and a D/A converter that outputs the predetermined limit current.

7. A capacitor charging apparatus according to claim 2, wherein the count-up signal of the time measuring circuit corresponds to a calculated value not exceeding the saturation current of an oscillating transformer in the DC/DC converter, related to the internal resistance of the battery, or corresponds to a determined fixed value not exceeding the saturation current of the oscillating transformer.

8. An electronic flash apparatus comprising:

a capacitor;

a DC/DC converter for stepping up the voltage of a battery and charging the capacitor;

a detection circuit that determines whether a primary current of the DC/DC converter reaches a predetermined limit current;

a control circuit that controls the DC/DC converter according to a detection signal received from the detection circuit; and a battery-information detection circuit that detects battery information, wherein the control circuit performs a predetermined calculation using the battery information received from the battery-information detection circuit to determine the predetermined limit current and to vary the primary current of the DC/DC converter so as to control the DC/DC converter each time the capacitor is charged by the DC/DC converter; and a discharge tube which emits light by discharging an energy charge accumulated in the capacitor.

9. A capacitor charging apparatus comprising:

a capacitor;

a DC/DC converter for stepping up the voltage of a battery and charging the capacitor;

a detection circuit that determines whether a primary current of the DC/DC converter reaches a predetermined value;

a control circuit that controls the DC/DC converter; and a battery check circuit that detects a state of the battery voltage before a charging operation of the capacitor is started by the capacitor charging apparatus, wherein the control circuit switches control of the DC/DC converter according to the state of the battery voltage detected by the battery check circuit between a first mode in which control is performed according to a detection signal received from the detection circuit, and a second mode in which control is performed according to a signal having a fixed pulse width.

10. A capacitor charging apparatus according to claim 9, wherein the control circuit switches control of the DC/DC converter from the first mode to the second mode when the internal resistance of the battery increases or when the battery voltage is reduced to a predetermined voltage or less.

11. A capacitor charging apparatus according to claim 9, wherein the primary current of the DC/DC converter obtained when the DC/DC converter is controlled according to a signal having the fixed pulse width is lower than the primary current of the DC/DC converter obtained when the DC/DC converter is controlled according to a detection signal sent from the detection circuit.

12. An electronic flash apparatus comprising:

a capacitor;

a DC/DC converter for stepping up the voltage of a battery and charging the capacitor;

a detection circuit that determines whether a primary current of the DC/DC converter reaches a predetermined value;

a control circuit that controls the DC/DC converter; and a battery check circuit that detects a state of the battery voltage before a charging operation of the capacitor is started by the electronic flash apparatus, wherein the control circuit switches control of the DC/DC converter according to the state of the battery voltage detected by the battery check circuit between a first mode in which control is performed according to a detection signal received from the detection circuit, and a second mode in which control is performed according to a signal having a fixed pulse width; and a discharge tube which emits light by discharging an energy charge accumulated in the capacitor.

* * * * *

UNITED STATES PATENT AND TRADEMARK OFFICE
CERTIFICATE OF CORRECTION

PATENT NO. : 6,516,153 B2
DATED : February 4, 2003
INVENTOR(S) : Yoshiaki Honda et al.

Figure 11:
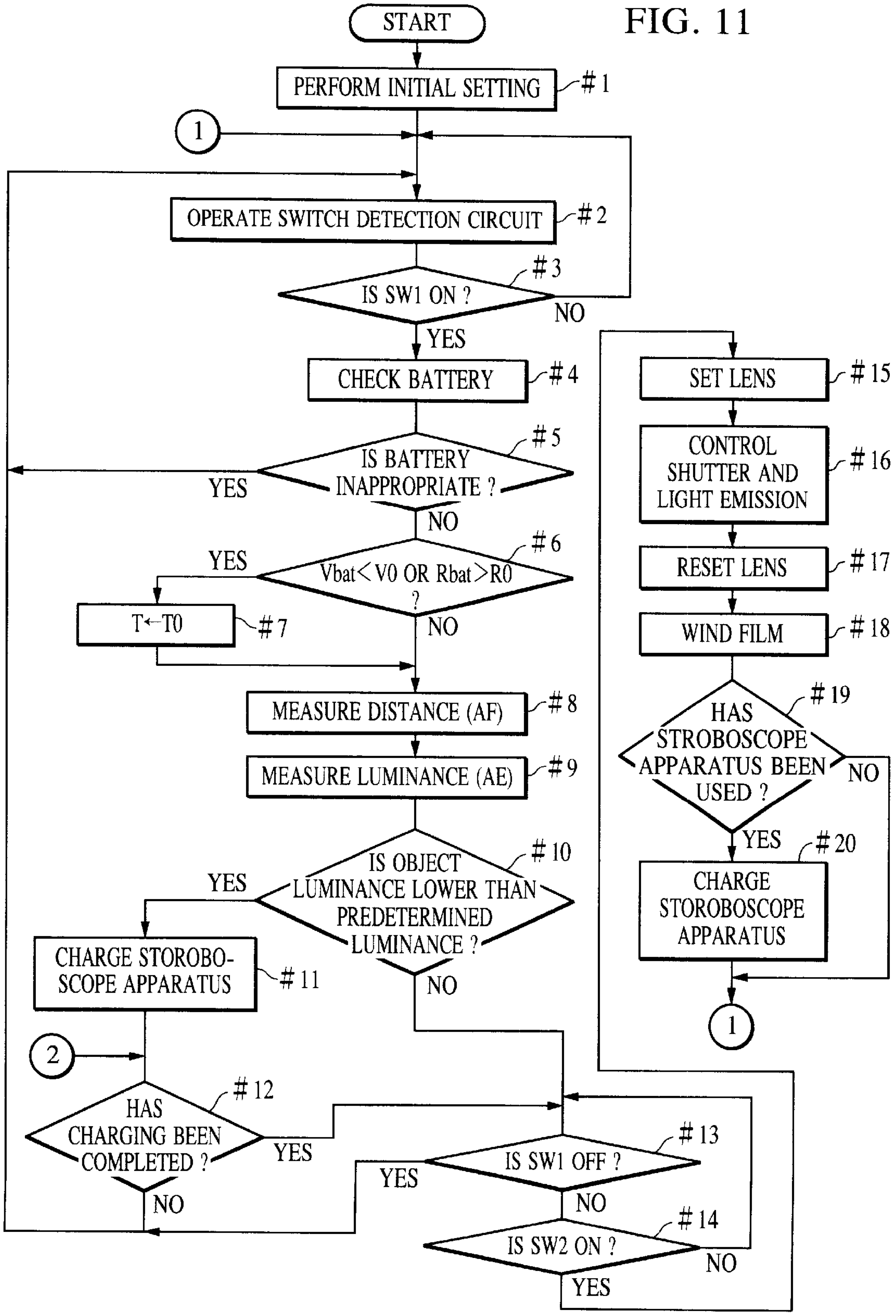
FIG. 11 is a flowchart of the operations of main portions of the camera shown in FIG. 10.

It is certified that error appears in the above-identified patent and that said Letters Patent is hereby corrected as shown below:

Drawings,
Sheet No 10, Figure 11, in Box 11, "STOROBO-" should read -- STROBO- --.
Sheet No 10, Figure 11, in Box 29, "STOROBOSCOPE" should read -- STROBOSCOPE --.

Column 1,
Line 22, "Therefore," should read -- Therefore, use of --.

Column 2,
Line 1, "})]" should read -- }] --.

Column 4,
Line 66, "an positive" should read -- a positive --.

Column 15,
Line 59, "A′due" should read -- A′ due --.

Column 17,
Line 56, "a capacitor" should read -- a capacitor; --.

Signed and Sealed this

Fourteenth Day of October, 2003

JAMES E. ROGAN
*Director of the United States Patent and Trademark Office*